(12) United States Patent
Raidt et al.

(10) Patent No.: US 8,076,613 B2
(45) Date of Patent: Dec. 13, 2011

(54) PANEL HEATING DEVICE

(75) Inventors: Heinz Peter Raidt, Dortmund (DE); Jörn Schröer, Herdecke (DE)

(73) Assignee: Ewald Dörken AG, Herdecke (DE)

( * ) Notice: Subject to any disclaimer, the term of this patent is extended or adjusted under 35 U.S.C. 154(b) by 903 days.

(21) Appl. No.: 11/909,870

(22) PCT Filed: Mar. 31, 2006

(86) PCT No.: PCT/EP2006/002919
§ 371 (c)(1),
(2), (4) Date: Apr. 10, 2008

(87) PCT Pub. No.: WO2006/103080
PCT Pub. Date: Oct. 5, 2006

(65) Prior Publication Data
US 2009/0200285 A1    Aug. 13, 2009

(30) Foreign Application Priority Data
Mar. 31, 2005   (DE) .......................... 10 2005 015 050

(51) Int. Cl.
*H05B 11/00* (2006.01)
*H05B 3/00* (2006.01)
(52) U.S. Cl. ........ 219/213; 219/211; 219/212; 219/528; 219/529; 219/543; 219/544; 219/545; 219/548; 219/202; 29/611
(58) Field of Classification Search .................. 219/528, 219/529, 543, 545, 548, 202, 211–213; 29/611
See application file for complete search history.

(56) References Cited

U.S. PATENT DOCUMENTS

| | | | |
|---|---|---|---|
| 3,535,494 A | 10/1970 | Armbruster | |
| 3,573,430 A | 4/1971 | Eisler | |
| 3,697,728 A | 10/1972 | Stirzenbecher | |
| 3,704,359 A | 11/1972 | Laing | |
| 3,779,547 A | 12/1973 | Pappas | |
| 4,060,710 A | 11/1977 | Reuter et al. | |
| 4,250,397 A | 2/1981 | Gray et al. | |
| 4,310,745 A | 1/1982 | Bender | |
| 5,371,340 A | 12/1994 | Stanfield | |
| 6,090,325 A | 7/2000 | Wheat et al. | |
| 6,172,344 B1 * | 1/2001 | Gordon et al. | 219/529 |
| 6,188,839 B1 | 2/2001 | Pennella | |
| 6,737,611 B2 | 5/2004 | Ek et al. | |

(Continued)

FOREIGN PATENT DOCUMENTS

EP    1429080    6/2004

(Continued)

OTHER PUBLICATIONS

U.S. Appl. No. 11/909,633, filed Mar. 31, 2006, Raidt et al.

(Continued)

*Primary Examiner* — Shawntina Fuqua
(74) *Attorney, Agent, or Firm* — Jason H. Vick; Sheridan Ross PC

(57) ABSTRACT

The invention depicts and describes a panel heating device (1) for placing in the area of floors, walls or ceilings, comprising an electrically conductive layer (2), another first layer (3), and electrical supply lines (5, 6). The invention provides that the first layer (3) is made of an electrically insulating and liquid-tight material.

16 Claims, 1 Drawing Sheet

U.S. PATENT DOCUMENTS

Figure 1:
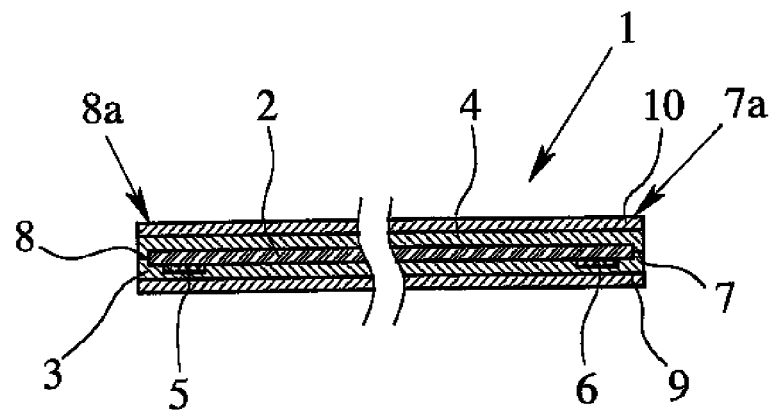

| | | |
|---|---|---|
| 2004/0175163 A1 | 9/2004 | Fukai et al. |
| 2004/0175183 A1 | 9/2004 | Willhoeft et al. |
| 2008/0210679 A1 | 9/2008 | Raidt et al. |

FOREIGN PATENT DOCUMENTS

| | | |
|---|---|---|
| FR | 2764678 | 12/1998 |
| FR | 2800445 | 5/2001 |
| GB | 1243898 | 8/1971 |
| WO | WO 2005/107323 | 11/2005 |

OTHER PUBLICATIONS

International Search Report (including translation) for International (PCT) Patent Application No. PCT/EP2006/002919, mailed Sep. 28, 2006.

Written Opinion (including translation) for International (PCT) Patent Application No. PCT/EP2006/002919, mailed Sep. 28, 2006.

International Preliminary Report on Patentability (including translation) for International (PCT) Patent Application No. PCT/EP2006/002919, mailed Oct. 3, 2007.

International Search Report (including translation) for International (PCT) Patent Application No. PCT/EP2006/002920, mailed Jul. 12, 2006.

Written Opinion (including translation) for International (PCT) Patent Application No. PCT/EP2006/002920, mailed Jul. 12, 2006.

International Preliminary Report on Patentability (including translation) for International (PCT) Patent Application No. PCT/EP2006/002920, mailed Oct. 3, 2007.

Official Action for U.S. Appl. No. 11/909,633, mailed Oct. 27, 2010.

Official Action for U.S. Appl. No. 11/909,633, mailed Mar. 12, 2010.

\* cited by examiner

PANEL HEATING DEVICE

The invention relates to a panel heating device for placement in the area of floors, walls or ceilings, with an electrically conductive layer, another first layer and electrical supply lines.

In order to heat living spaces, heaters are commonly used. Whereas radiators were predominantly set up in the rooms to be heated in the past, today heating is increasingly being provided via floor heating as well. The use of panel or resistance heating systems, among other things, is known for this purpose. Familiar applications include mats with tubular-shaped resistance cables attached on them. These are embedded into the flooring, with a relatively large amount of flooring material being required for the embedding. A further disadvantage of the known panel heaters consists in that, when applied in certain areas of a house or apartment, impairments and malfunctions of the panel heating system can easily occur.

It is therefore the object of the present invention to make available a panel heater of the type mentioned at the outset in which the aforementioned disadvantages do not occur.

The aforementioned object is achieved according to the invention in a panel heating device of the type mentioned at the outset essentially in that the first layer consists of an electrically insulating and liquid-tight material. The inventive choice of the material of the first layer results in the substantial advantage that water cannot pass through the panel heater. This therefore results in a sealing on the plane.

It is particularly advantageous that, in addition to the first layer, another second layer made of an electrically insulating and liquid-tight material is provided, with the electrically conductive layer and the electrical supply lines being disposed between the first layer and the second layer. This produces a composite or layered material which carries out several functions simultaneously. The selection of the material for the first and second layers yields not only an electrical insulation, but also a reliable liquid, moisture, and water seal in the plane at the same time. Through the electrical insulation of the electrically conductive layer and the supply lines, the panel heater according to the invention can also be used in living areas in which routine penetration of moisture can be expected, such as in bathrooms, for example. Even if the panel heater according to the invention comes into contact on its outside with moisture, its function is not impaired as a result. The occurrence of fault currents need not be feared.

Particularly suited as a material for the first and/or the second layer are plastics, preferably polyolefins, polyester, polyurethane, and PVC. Polyethylene or polypropylene is especially preferred. It goes without saying that the plastics used can contain additives such as stabilizers, metal deactivators, crosslinking agents, colorants, fillers, strengtheners, and the like.

The other first later and/or the other second layer can be designed as a heat-insulating layer or be joined to at least one heat-insulating layer. The heat-insulating layer can consist of polyurethane, polyisocyanurate, expanded polystyrene, foamed polystyrene, mineral wool, fiberglass, hemp, sheep's wool, or (recycled) cellulose plates. In this context, it is also possible to apply the heat-insulating layer subsequently by means of laminating with an adhesive. Furthermore, an extrusion coating can be provided, for example during the manufacture of the other first layer. It is otherwise possible to fasten the other first layer and/or the other second layer reactively or physically during the manufacture of the insulating layer, e.g. through attachment/fastening of a fiber/floc mixture using resins, or during the physical foaming of expanded or foamed polystyrene or during the reactive foaming of polyurethane or polyisocyanurate. Depending on its composition, the heat-insulating layer can be used as a further insulating of water-tight layer or even as an acoustically insulating layer. Preferably, the heat-insulating layer can have a thickness of from 5 mm up to greater than 100 mm, particularly of 20 mm. One sample embodiment makes the provision that, during manufacture, a polyurethane ribbon foam (already in itself known) made of diisocyanate, polyol and penthane as a heat-insulating layer, a panel heating device with an electrically conductive layer is fed to another first layer and electrical supply lines, so that the electrically conductive layer is facing toward the foam. In so doing, the reaction mixture can be poured onto the panel heating device, or it can form the upper boundary against which foaming is performed. Even the ribbon foam as such can form the other first layer. In addition, it is possible to affix the electrically conductive layer, the other first layer and the electrical supply lines to a vacuum insulating element.

In an alternative embodiment, a provision can be made for the other first layer and/or the other second layer to consist of concrete or for the other first layer and/or the other second layer to be joined to a concrete layer. Here, a provision can be made to insert the panel heating device into a formwork, for example on site or during the manufacture of finished elements at the factory. One sample embodiment makes the provision that a formwork for the creation of a concrete wall is built up, with the panel heating device being fastened to an electrically conductive layer, another first layer and electrical supply lines in the formwork on what is to be the visible side, so that the electrically conductive layer is oriented toward the concrete. Subsequently, the formwork is poured out in the familiar manner.

Moreover, in order to reduce walking noise, an additional provision can be made that the other first layer and/or the other second layer is a heavy foil or that the other first layer and/or the other second layer is joined to at least one acoustic protection layer, particularly a heavy foil, for the reduction of walking noise. One sample embodiment provides for the use of a heavy foil with a surface weight of approx. 6 kg/m$^2$ of 85 wt. % barium sulfate and 15 wt. % binding agent. Optionally, a further acoustically insulating layer can be provided, for example a crosslinked polyethylene foam with a thickness of approx. 1 mm and a density of approx. 90 kg/m$^3$.

Particularly when using polypropylene but also when using other polymer materials, it is possible to design the layered composite of the panel heating device as a vapor seal with a vapor permeability per DIN 52615 (23/0→85) of less than 10 g/(m$^2$×24 h), preferably less than 5 g/(m$^2$×24 h), and particularly less than 1 g/(m$^2$××24 h). Consequently, the first and/or second layer assumes a further function in addition to the aforementioned insulating and sealing functions by means of which it is ensured that water vapor from the subsurface does not penetrate into the coat applied to the panel heater and impair the coating or its connection to the panel heating device, or does so only to a very small extent, or that moisture [does not] penetrate into the construction underlying the panel heater in the bath area, for example.

Since the panel heater is, after all, a mass-produced product, it is expedient for technical manufacture-related reasons to produce the panel heater as sheeting. In particular, a provision can then be made in this context that the first layer and the second layer are joined to each other at the mutually facing sides, i.e. the longitudinal edges, in a liquid-tight and, particularly, a vapor-tight manner along the edge, so that a panel composite of several sheets joined together is created which is insulated and liquid-tight overall. In order to achieve such a panel composite, several possibilities can be provided for. In one alternative, a provision is made that the width of the electrically conductive layer is smaller than the respective width of the first and the second layer, so that, in the end, an overhang is produced on both sides over which the two layers can be joined tightly together. The edge produced in this context should have such a length on both sides that a liquid-tight, particularly vapor-tight, joint is possible in the installed state to an edge of the neighboring panel heater. In order to ensure a reliable joint here, the edge should be greater than 1 cm on each side. A length of greater than 5 cm is technically no longer necessary. In an alternative, the individual sheets can be laid edge to edge such that the edges abut. A sealing band can then be applied, particularly welded on or glued on. In principle, it is also possible to overlap the individual sheets in the edge area and join them together.

The formation of the panel heater as sheeting also results in additional advantages. The panel heater according to the invention can be adapted very easily to the local installation conditions. The respective sheets can be shortened at will and, if necessary, be cut into or cut out accordingly. An adaptation to uneven subsurfaces is also easily possible due to the layered material used. Here, at least one compensation layer can be optionally provided for any unevenness of the subsurface; an acoustic protection layer can optionally also be used to compensate for unevenness. As a result, the panel heater according to the invention offers an enormous amount of flexibility. Furthermore, sheeting offers the advantage that it can be rolled up, which makes transport, storage and handling considerably easier.

Since the panel heater according to the invention is preferably manufactured as sheeting, it is advantageous if the first layer as well as the second layer are designed as a coating applied to the electrically conductive layer with a weight per unit area of between 20 $g/m^2$ and 1000 $g/m^2$, preferably between 50 $g/m^2$ and 250 $g/m^2$. It of course goes without saying that it is also possible in principle to design the first and/or second layer as a foil sheet. The composite material consisting of the first and the second layer as well as the electrically conductive layer with the supply lines thus has a decidedly low structural profile, which offers enormous installation advantages, and not only in new constructions. In addition, the panel heating device according to the invention can be easily provided retroactively, for example during a renovation, particularly in older buildings, which is made easily possible precisely due to the low structural profile.

To improve the electrical safety, durability and, if applicable, the undercoat characteristics of the panel heating device according to the invention, for certain applications it may prove expedient to form the insulating layer in several layers, for example through coextrusion, which is to say that at least one additional insulating layer is applied to the first layer and/or the second layer.

In order to obtain good heating characteristics in addition to a good bond to the first and second layer, the electrically conductive layer should contain conductive fibers such as carbon fibers, for example, over the surface to be heated and, particularly, be designed in the manner of a fleece. In addition, the use of an electrically conductive layer offers the substantial advantage that perforations, incisions and the like do not lead to the functional failure of the panel heating device. It is economically advantageous and, if applicable, advantageous for the adjustment of conductivity that a mixture with glass fibers and/or other fibers be used. It is particularly expedient here if the electrically conductive layer has between 50% and 90% glass fibers and 10% to 50% carbon fibers. The weight per unit area of the electrically conductive layer should be between 5 $g/m^2$ and 150 $g/m^2$ and particularly between 10 $g/m^2$ and 40 $g/m^2$, i.e. be lower than the weight per unit area of the first and the second layer, which contributes to the very low structural profile of the panel heater according to the invention.

In order to prevent delamination or detachment from the subsurface, the electrically conductive layer can have a plurality of preferably regularly arranged openings, where the surface proportion of the openings on the base surface of the electrically conductive layer can preferably be between 5% to 20%, in particular about 10%. Through the open areas in the electrically conductive layer, an embedding of the first layer and/or the second layer into the open areas can be achieved during the manufacture of the panel heating device according to the invention, wherein the openings can, particularly, be continuous, which allows for the penetration of the conductive layer from both sides. In one sample embodiment, a provision is made that holes with a diameter of 2 mm to 6 mm, preferably of 4 mm, are punched into the electrically conductive layer in regular intervals so that the remaining non-perforated portion of the surface is at least 80%, preferably about 90%.

Since the electrically conductive layer is generally relatively thin and can hardly withstand tensile forces, a provision can be made that the electrically conductive layer has at least one further layer which has the function, for example, of a supporting layer. The further layer does not necessarily need to be electrically conductive. The electrically conductive layer itself can thus be designed as a layered material having several layers.

Instead of or in addition to the aforementioned further layer, a reinforcement layer, preferably a lattice-like one, can be provided on the panel heating device. In the layered composite of the panel heating device, this reinforcement layer can be provided anywhere, in principle. This layer essentially serves to withstand tensile forces in order to protect the electrically conductive layer. Another advantage of this layer lies in the fact that it serves to improve the flatness of the panel heating device.

In particular, if the electrically conductive layer is designed as a fleece, it is expedient to apply the first and the second layer as well onto the electrically conductive layer through extrusion coating. The result is not only a reliable, smooth joint to the electrically conductive layer[, but,] in addition, the electrical supply lines are also affixed onto the electrically conductive layer. In the invention, it is thus not necessary to attach the supply lines in any further manner to the electrically conductive layer, for example by means of an additional adhesive bond.

In order to obtain an especially good fixing of the supply lines on the electrically conductive layer by means of the extrusion coating, the supply lines should not be disposed directly at the edges or longitudinal edges of the electrically conductive layer, but rather at a prescribed distance, so that a joint can still be formed in this area between the extruded material and the electrically conductive layer. To achieve a reliable bond, the distance should be greater than 2 mm.

In addition, the electrical connection is set up such that two parallel supply lines are provided which are disposed spaced apart from each other in the areas of longitudinal edges of the electrically conductive layer at the aforementioned prescribed distance from the longitudinal edge. The supply lines should consist of highly conductive material such as copper, for example, or a copper alloy, in order to ensure a uniform heating of the heater. In order to have as small a thickness as possible with supply lines that are to be applied separately, it is expedient to design the supply lines in the manner of strips and otherwise in the manner of netting. Netting has the substantial advantage that longitudinal changes during operation are easily possible and the heater is particularly flexible.

In principle, it is also possible to work the electrical supply lines into the electrically conductive layer if it is designed to be fibrous or fleece-like. In this case, fibers made of a material with high conductivity with respect to the conductivity of the conductive layer are put in place in both lateral edge areas of the layered sheet. In so doing, copper fibers could be provided, for example. By virtue of the quantity or concentration of the fibers having higher electrical conductivity provided there, supply lines can be implemented which run longitudinally within the electrically conductive fleece-like or fibrous material. The preceding feature also has proprietary inventive significance.

Incidentally, it can prove expedient in the case of a fleece-like or fibrous material if electrically conductive fibers are not provided over the entire surface in the area to be heated in the sheeting, but rather are only provided in electrically conductive fibers running transversely in a sectional manner. The spacing of neighboring electrically conductive fiber areas, in turn, depends on the respective application. The fiber areas between neighboring conductive fiber areas are not electrically conductive. Such an arrangement is relatively economical, since the comparably expensive electrically conductive fiber material is not used over the entire surface.

Moreover, it is possible to design the electrically conductive layer in the manner of a weave or a clutch. In this case, a plurality of transversely running weft threads made of electrically conductive material are still provided. It is self-evident that non-conductive weft threads can also be provided in addition to the electrically conductive weft threads. The distance of the electrically conductive weft threads from each other depends on the respective application. For use in the floor area, a heat distribution on the respective covering that is as uniform as possible is desired, whereas a highly uniform heat distribution is not essential for use in the wall or ceiling area. The weft threads can each be contacted in the lateral edge area through electrical supply lines to be applied separately. However, it is particularly advantageous to provide electrically conductive edge warp threads in the respective edge area, which contact the electrically conductive weft threads. The remaining warp threads running longitudinally are not electrically conductive.

In principle, it is possible to provide, in addition to the electrically conductive layer, at least one other electrically conductive layer which is electrically isolated from the aforementioned conductive layer. This other conductive layer is not connected to the electrical supply lines, but rather is optionally grounded, resulting in a protective function from radiation of electrical and electromagnetic fields.

As was already explained at the outset, the panel heating device according to the invention can be provided for placement in the floor, wall or ceiling area. For use in the wall or ceiling area, the panel heating device can be designed in the form of a wallpaper. In this case, the outside layer facing the room can be structured and/or provided with a decorative surface. A similar design can be expedient for use in the floor area, though the outer layer should be a comparably thick and resistant covering material or a covering that can be walked on.

In principle, another problem which occurs in connection with panel heating devices consists in that a reliable bond to the subsurface or the coverings which are applied onto the panel heater can frequently not be achieved.

In order to resolve the abovementioned problem, a provision is made according to the invention that the outer layer of the panel heater has a fleece-like, fibrous or porous material and/or is provided with undercuts and/or projections or is designed as an adhesion promoter and/or adhesive layer and hence serves as an adhesive bridge to the joint on the bottom or top side. Finally, the inventive arrangement makes two alternative possibilities available. One alternative involves making an outer, structured layer available with a surface that is as large as possible into which an adhesive, for example, can easily penetrate or onto the undercuts or projections of which it can bond well, hence resulting in a solid bond to the subsurface or covering applied thereon. The undercuts can already be provided during the manufacture of the layers. The same applies to the projections, which can consist of the same material as the layer itself. Alternatively or in addition, the projections can also be produced, for example, through sanding, partial embedding of fragments or the like. In the other alternative, the outer layer is designed as an adhesion promoter and/or adhesive layer by means of which the bond to the subsurface or the covering applied thereon is produced.

It has been determined that the effect of the adhesive bridge is especially good if the outer layer is designed as a fleece, particularly as a plastic fleece and preferably of polypropylene. An adhesive can penetrate relatively deeply into such a fleece, resulting in a solid and reliable bond.

In another embodiment, a provision can be made that the outer layer is joined with a concrete or plaster layer. Here, the panel heating device can be provided as an optical finishing in the manner of a wallpaper or, for example, serve as a plaster carrier, where the adhesive bridge layer can act as a decoupling level between the plaster and the subsurface.

Moreover, the outer layer can be connected to at least one acoustically insulating layer, particularly with a heavy foil.

It is particularly favorable if the adhesive bridge arrangement is combined in connection with the electrical insulation, water seal and, optionally, the vapor seal function as well. To this end, the one outer layer is then formed as a further third layer which is applied to the first layer, whereas the other outer layer is designed as a fourth layer which is applied onto the second layer. However, it should be pointed out that it is easily possible to provide other layers between the adhesive bridge layer and the layer applied directly onto the electrically conductive layer.

Incidentally, it goes without saying that, in the alternative embodiment of the panel heating device according to the invention described above with an adhesive bridge, the features disclosed in connection with the embodiment described above can be implemented in isolation or in any combination.

Note that all of the aforementioned ranges comprise the values lying within the respective range even if they are not listed individually.

Moreover, the present invention also relates to a method for the manufacture of a panel heating device of the type named at the outset, with the constructive features being implemented accordingly using the method. For example, the electrically conductive layer can be obtained through physical vacuum deposition of metal or a metal alloy on the other first layer, where the other first layer can be a foil, a fleece or a woven fabric.

Moreover, graphite foils can be used as electrically conductive layers or the electrically conductive layer is obtained by coating the other first layer with graphite and a binding agent. In this context, conductive soot can also be used in place of graphite. The first layer is preferably a fleece carrier. In one sample embodiment for the physical vacuum deposition of metals onto a foil, a polyester foil with a thickness of approx. 50 µm is sputtered with titanium particles with a size of approx. 300 nm.

The individual features will not be repeated here. Moreover, the present invention relates to a method for laying a panel heater of the aforementioned type. The individual methods shall be explained in further detail in connection with the sample embodiments.

One possible area of application of the panel heating device according to the invention is represented by the heating of parallel gutters, particularly in the roof area. In the window area, the panel heating device according to the invention can be provided to prevent the formation of condensate, where the panel heating device can be disposed under the window opening on the wall or under the window sill. It is also possible to use the panel heating device according to the invention directly as a window sill in the form of a composite plate.

In the following, the invention is described in further detail on the basis of the drawing.

Figure 2:
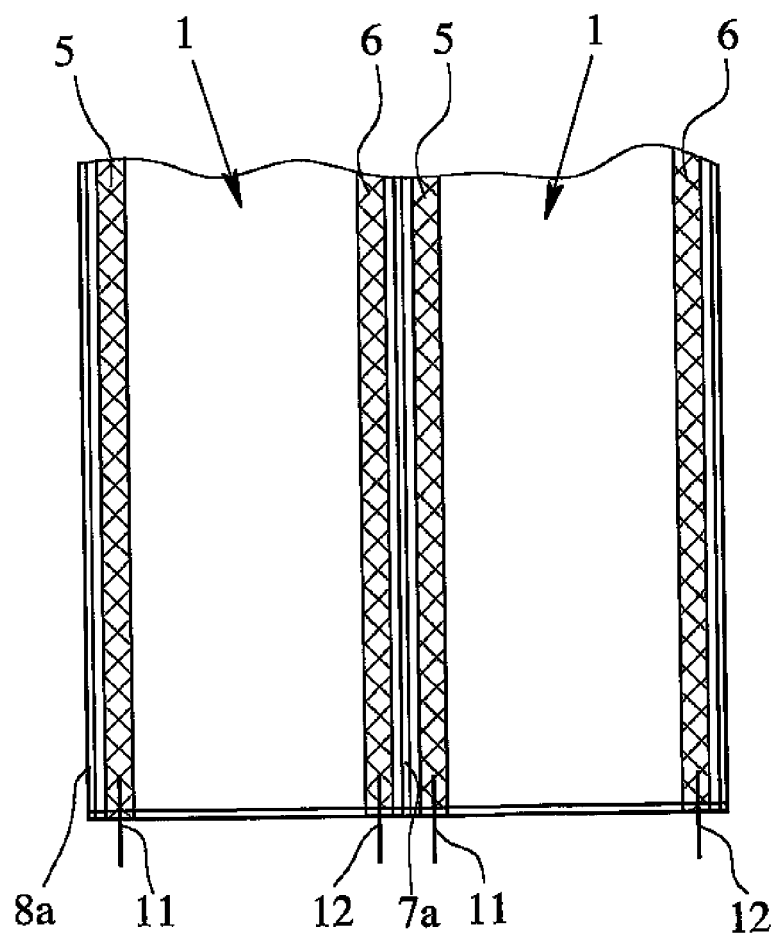

FIG. 1 shows a schematic cross-section of a panel heating device according to the invention, and FIG. 2 shows a top view of a portion of an installed panel heater with several sheets of panel heating devices.

Represented schematically in FIG. 1 is a panel heating device 1. The panel heating device 1 is provided for placement in the area of floors, walls or ceilings. The panel heating device 1 has an electrically conductive layer 2 and a plurality of other layers. Immediately neighboring the electrically conductive layer 2 is a further first layer 3, which is provided on the lower side of the electrically conductive layer 2. Provided on the upper side as another layer is a second layer 4. Moreover, the panel heating device 1 has electrical supply lines 5, 6, which contact the layer 2. The electrically conductive layer 2 and the electrical supply lines 5, 6 are disposed between the first layer 3 and the second layer 4.

A provision is now made that the first layer 3 and the second layer 4 consist of an electrically insulating and liquid-tight material. In principle, this material can be any type of plastic. In the sample embodiment, it is polypropylene, which also carries out the function of a vapor seal here with a vapor permeability of 0.92 g/(m²×24 h) (per DIN 52615).

The panel heating device 1 is a layer material which, as follows particularly from FIG. 2, is manufactured as sheeting.

As also follows from the figures, the first layer 3 and the second layer 4 are joined together on their facing sides on their edges by means of a corresponding joint 7, 8. The joints 7, 8 are each liquid-tight and, particularly, vapor-tight, so that, for one thing, liquid is not able to get to the electrically conductive layer 2 and, for the other, it is not possible for vapor to pass through an installed panel heater as depicted in FIG. 2.

As a result of the joints 7, 8, a protruding edge 7a, 8a is respectively formed on the two longitudinal sides of the panel heater. Here, the edge should have a length such that a liquid-tight and, particularly, vapor-tight joint is possible in the installed state with an edge of a neighboring panel heating device 1. In the depicted sample embodiments, the protruding edge 7a, 8a has a length of about 2 cm. When two panel heating devices 1 lie next to each other, an overlapping then results which is sufficient to achieve a continuous longitudinal joint between these edges.

Here, the electrically conductive layer 2 is a heatable fleece with a weight per unit area of 20 g/m² which consists of 80% glass fibers and 20% carbon fibers and a binding agent. The width of this sheet is about 1 m. In principle, it is also possible that the electrically conductive layer has an additional, optionally even not electrically conductive carrier layer. The first layer 3 is applied by means of extrusion coating with interposition of the electrical supply lines 5, 6 onto the electrically conductive layer 2, so that the supply lines 5, 6 are affixed onto the electrically conductive layer 2 such that they contact this. The second layer 4 is also applied onto the electrically conductive layer by means of extrusion coating. The first and the second layer 3, 4 have a weight per unit area of about 100 g/m² and each has a width of about 1.04 m. The layers 3, 4 protrude on both sides over the electrically conductive layer 2, so that the joints 7, 8 can be implemented.

Two parallel electrical supply lines 5, 6 are provided for the electrically conductive layer 2. Each of the supply lines 5, 6 is disposed in the area of a longitudinal edge of the electrically conductive layer 2 at a distance of about 0.5 cm from the longitudinal edges. The supply lines 5, 6 themselves consist of copper or a copper alloy, are ribbon-shaped, and are designed as a netting. Here, the width of the supply lines is 5 mm.

In the layered material depicted in FIG. 1, in addition to the electrically conductive layer 2 and the first and second layer 3, 4, two outer layers 9, 10 are provided. Here, these outer layers 9, 10 are a thermosetting polypropylene spun fleece, preferably with a weight per unit area of 70 g/m². These layers are adhesive bridges which provide a reliable bond to the subsurface on the one hand and to the coverings applied to the panel heater on the other hand. It is self-evident that, depending on the application, one of the outer layers 9, 10 can also be omitted.

Even though not depicted, it is possible in principle that the outer layers 9, 10 also be applied directly—i.e. while omitting the first layer 3 and the second layer 4—onto the electrically conductive layer 2.

However, the outer layers 9, 10 as third and fourth layer not only have the function of an adhesive bridge for secure bonding, but rather are also used for the decoupling from the subsurface or covering. Decoupling means that levels are provided which can be moved relative to each other, i.e. that a change in length or a shift of the panel heating device 1 with respect to the substrate or covering is easily possible. This decoupling is produced for example in that, while an adhesive penetrates deep into the outer fibrous layer, a sufficiently thick fibrous area remains to fulfill the decoupling function.

Incidentally, while not depicted, another electrical layer can be provided which is electrically isolated from the conductive layer 2 and the supply lines 5, 6, and which is then preferably grounded.

The manufacture of the panel heating device 1 (not depicted separately) proceeds such that the electrically conductive layer 2 is extrusion-coated on one side in a first work step. At the same time, the outer layer is conveyed on the other side to the polypropylene melt. Parallel to this or in a second work step, the previously described first work step is carried out analogously. Here, the two supply lines 5, 6 also run in. During the extrusion coating of the lower side of the electrically conductive layer 2 with interposition of the supply lines 5, 6, a fixation of the supply lines 5, 6 on the electrically conductive layer 2 occurs with simultaneous contacting without further bonding agents or joints being provided between the supply lines 5, 6 and the electrically conductive layer 2. This good composite adhesion occurs because, during the extrusion coating, the melts of the layers 3 and 4 penetrate into the pores of the conductive layers 2 and the supply lines 5, 6 or even penetrate through them in part.

The installation of a panel heating device 1 of the aforementioned type is performed such that a strip of the panel heating device 1 is cut to length from the sheeting for the prescribed application, i.e. it is cut off. This finished strip can then be adhered for example with conventional construction adhesive to the flooring, the wall, or the ceiling. This results in a reliable bond to the subsurface due to the outer layer 9. In order to electrically connect the panel heating device 1, the supply lines 5, 6 are then exposed in areas and electrically connected to electrical connection lines 11, 12. Subsequently, the exposed areas are insulated and sealed. In order to provide for complete surface heating in the respective room, several strips are disposed next to each other which are connected, particularly welded or glued, to each other at their edges. Moreover, the strips are sealed off along their cut-off front side accordingly. This can also take place directly by means of appropriate adhesion or sealing elements that are to be applied separately, which are applied on the end side and then joined with a layered composite.

The invention claimed is:

1. Panel heating device for arrangement in the area of floors, walls or ceilings, with an electrically conductive layer, a further first layer and electrical supply lines wherein the first layer, and a further second layer consist of an electrically insulating and liquid-tight material and that the electrically conductive layer and the electrical supply lines are disposed between the first layer and the second layer; and
    wherein longitudinally running fiber areas with fibers having elevated electrical conductivity are provided in an edge area of the electrically conductive layer in order to form supply lines.

2. Panel heating device as set forth in claim 1, wherein at least one of the first layer and the second layer are made of plastic, preferably polyolefins, polyester, polyurethane or PVC and particularly of polyethylene or polypropylene and that the further first layer or the further second layer are designed as a heat-insulating layer and consist of polyurethane, polyisocyanurate, expanded polystyrene, foamed polystyrene, mineral wool, fiberglass, hemp, sheep's wool or (recycled) cellulose plates or that at least one of the other first layer and the other second layer are joined to at least one heat-insulating layer made of polyurethane, polyisocyanurate, expanded polystyrene, foamed polystyrene, mineral wool, fiberglass, hemp, sheep's wool or (recycled) cellulose plates.

3. Panel heating device as set forth in claim 1, wherein at least one of the further first layer and the further second layer consist of concrete or that at least one of the further first layer and the further second layer are joined to a concrete layer.

4. Panel heating device as set forth in claim 1, wherein the first layer and the second layer are joined on at least two opposing sides on the edge in a liquid-tight, particularly vapor-tight, manner.

5. Panel heating device as set forth in claim 1, wherein at least one other electrical insulating and liquid-tight layer is applied to at least one of the first layer and the second layer.

6. Panel heating device, as set forth in claim 1, wherein the electrically conductive layer is designed in the manner of a weave or a clutch, and that a plurality of electrically conductive weft threads are provided and that, particularly, at least one, and preferably a plurality of electrically conductive edge warp threads are respectively provided in the edge area.

7. Panel heating device, as set forth in claim 1, wherein the electrically conductive layer has a plurality of preferably regularly arranged openings wherein, preferably, the surface proportion of the openings on the base surface of the electrically conductive layer is between 5% and 20%, particularly about 10%.

8. Panel heating device as set forth in claim 1, wherein a reinforcement layer, preferably a lattice-like one, is provided to improve the flatness of the panel heating device and to withstand tensile forces in order to protect the electrically conductive layer.

9. Panel heating device as set forth in claim 1, wherein the first layer is applied by means of extrusion coating with interposition of the electrical supply lines onto the electrically conductive layer such that the supply lines are affixed onto the electrically conductive layer or that the second layer is applied by means of extrusion coating onto the electrically conductive layer.

10. Panel heating device as set forth in claim 1, wherein at least one of a structuring, decorative lamination, coating, and covering that can be walked on is applied on the outer side of the panel heating device facing a room.

11. Panel heating device for placement in the area of floors, walls or ceilings, with an electrically conductive layer, at least one other outer layer, and electrical supply lines, wherein the outer layer has a fleece-like, fibrous or porous material provided with undercuts or projections or is designed as an adhesion promoter or adhesive layer and hence serves as an adhesive bridge to the joint on the bottom or top side; and
    wherein the outer layer is joined to at least one acoustically insulating layer, particularly to a heavy foil, in order to reduce walking noise.

12. Panel heating device as set forth in claim 11, wherein a lower-side outer layer and an upper-side outer layer are provided between which the electrically conductive layer and the supply lines are disposed, that the lower-side outer layer is designed as a further third layer which is applied onto the first layer or that the upper-side outer layer is designed as a further fourth layer which is applied onto the second layer.

13. Panel heating device as set forth in claim 11, wherein there is provided a decoupling within at least one layer or between two neighboring layers.

14. Panel heating device for placement in the area of floors, walls or ceilings, with an electrically conductive layer, at least one other outer layer, and electrical supply lines, wherein the outer layer has a fleece-like, fibrous or porous material provided with undercuts or projections or is designed as an adhesion promoter or adhesive layer and hence serves as an adhesive bridge to the joint on the bottom or top side;
    wherein there is provided a decoupling within at least one layer or between two neighboring layers.

15. Panel heating device for arrangement in the area of floors, walls or ceilings, with an electrically conductive layer, a further first layer and electrical supply lines wherein the first layer, and a further second layer consist of an electrically insulating and liquid-tight material and that the electrically conductive layer and the electrical supply lines are disposed between the first layer and the second layer; and
    wherein the first layer has a fleece-like, fibrous or porous material provided with undercuts or projections or is designed as an adhesion promoter or adhesive layer and hence serves as an adhesive bridge to the joint on a bottom or top side.

16. Panel heating device for arrangement in the area of floors, walls or ceilings, with an electrically conductive layer, a further first layer and electrical supply lines wherein the first layer, and a further second layer consist of an electrically insulating and liquid-tight material and that the electrically conductive layer and the electrical supply lines are disposed between the first layer and the second layer; and
    wherein there is provided a decoupling within at least one layer or between two neighboring layers.

* * * * *